United States Patent [19]

Weyler, Jr.

[11] 4,098,142

[45] Jul. 4, 1978

[54] ROTATABLE MASS FOR A FLYWHEEL

[75] Inventor: George M. Weyler, Jr., Huntsville, Ala.

[73] Assignee: The United States of America as represented by the Administrator of the National Aeronautics and Space Administration, Washington, D.C.

[21] Appl. No.: 632,111

[22] Filed: Nov. 14, 1975

[51] Int. Cl.² .............................................. G05G 1/00
[52] U.S. Cl. ................... 74/572; 15/230.16; 15/230.17; 29/125; 428/133
[58] Field of Search ................. 74/572; 428/133, 138, 428/212; 15/230.12, 230.16, 230.17; 29/125

[56] References Cited

U.S. PATENT DOCUMENTS

| 188,670 | 3/1877 | Poole | 29/125 X |
| 520,516 | 5/1894 | Cleary | 15/230.17 |
| 2,027,425 | 1/1936 | Hall | 15/230.16 |
| 3,296,886 | 1/1967 | Reinhart, Jr. | 74/572 |
| 3,788,162 | 1/1974 | Rabenhorst | 74/572 |

*Primary Examiner*—Samuel Scott
*Assistant Examiner*—Randall Heald
*Attorney, Agent, or Firm*—L. D. Wofford, Jr.; John R. Manning

[57] ABSTRACT

An improved rotatable mass for a flywheel characterized by a plurality of coaxially aligned, contiguous disks mounted on a spin shaft, each disk of the plurality being formed of a plurality of woven fibers disposed in a plane transversely related to an axis of rotation with the fibers of alternate disks being continuous throughout their length, while the midportion of the fibers of the remaining disks of the plurality is removed for defining annular voids concentrically related to the spin shaft.

3 Claims, 3 Drawing Figures

ROTATABLE MASS FOR A FLYWHEEL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to energy storage devices, and more particularly to an improved rotatable mass for an energy storage device adapted to be employed as a flywheel.

Because of the so-called energy crisis, renewed interest has been experienced for energy storage devices capable of storing energy obtained at low costs for use under different conditions at later periods of time.

As discussed in Scientific American, December, 1973, Volume 229, No. 6, flywheels are notoriously old and have long been used for storing energy. However, until recently it was thought that the use of flywheels was severely limited due to factors including weight of the rotatable mass forming the rotor, and fabrication costs.

As is well known, the amount of energy which can be stored in a flywheel depends largely upon the weight of the rotatable mass and the angular velocity at which the mass is caused to spin. The limit of the amount of energy which can be stored in the rotatable mass of a flywheel ultimately is determined by the tensile strength of the material from which the mass is made.

2. Brief Description Of The Prior Art

It has been suggested that the materials most suited for use in fabricating a rotatable mass for a flywheel are characterized by low density and high tensile strength. Recently, efforts have been directed to developing rotatable masses for flywheels from such materials. The results of such efforts are typified by the devices described in the disclosures of U.S. Pat. Nos. 3,296,886, 3,788,162 and 3,859,868.

However, those engaged in the design of flywheels continue to be plagued by the destructive effects of stress, both tangential and radial, which results from angular velocities operatively imposed on flywheels. For example, flywheels having a solid mass of thick-ring configuration, formed from circumferentially wound glass fibers, embedded in an epoxy, fail at speeds far below the limit set by the tensile strength of the fibers. Usually, this is because of progressively worsening radial delamination within the rotary masses of the flywheels.

Additionally, where a flywheel mass is mounted on a shaft extended through an opening formed therein by removing materials from the center of the mass, the flywheel is subject to failure, due to the resulting stresses in the zone immediately adjacent to the opening formed by the removal of the materials. In instances where fibers are arranged in parallelism and then bonded together for forming a disk-shaped rotary mass, in a manner such that the fibers lie along cords of the mass, the flywheel is subject to failure during high speed operations, for substantially the same reasons as are flywheels formed from circumferentially wound glass fibers, as hereinbefore discussed.

It is, therefore, apparent that even though substantial efforts have been made to improve rotary energy storage devices by fabricating the rotatable masses of such devices from fibers characterized by low density and exhibiting high tensile strength characteristics, further advances in the design and fabrication of rotatable masses for energy storage devices are highly desirable, or even necessary, in order to enhance the adaptability and use of such devices in the continuing effort to acquire a solution to the problem of efficiently utilizing available energy.

It is, therefore, the general purpose of the instant invention to provide an economic and practical rotatable mass for a flywheel which is characterized by increased energy storage capabilities and an operational life of increased duration.

OBJECTS AND SUMMARY OF THE INVENTION

It is, therefore, the object of the instant invention to provide an improved rotatable mass for a flywheel.

It is another object to provide a rotatable mass for a flywheel which overcomes the aforementioned disadvantages and difficulties, without sacrificing the recognized energy storage characteristics thereof.

It is another object to provide a durable rotatable mass for a flywheel which is economic to fabricate and practical to employ in storing inertial energy.

It is another object to provide an improved rotatable mass for a flywheel which is capable of withstanding the increased stress encountered when increased angular velocities are imposed thereon.

These and other objects and advantages are achieved through the use of a plurality of coaxially aligned, contiguous disks, each being fabricated from a plurality of woven fibers, mounted on a common, concentrically related shaft, the fibers of alternate disks being continuous while the midportion of the fibers of the remaining disks are removed for defining annular voids, as will become more readily apparent by reference to the following description and claims in light of the accompanying drawings.

DESCRIPTION OF THE PREFERRED EMBODIMENT

Figure 1:
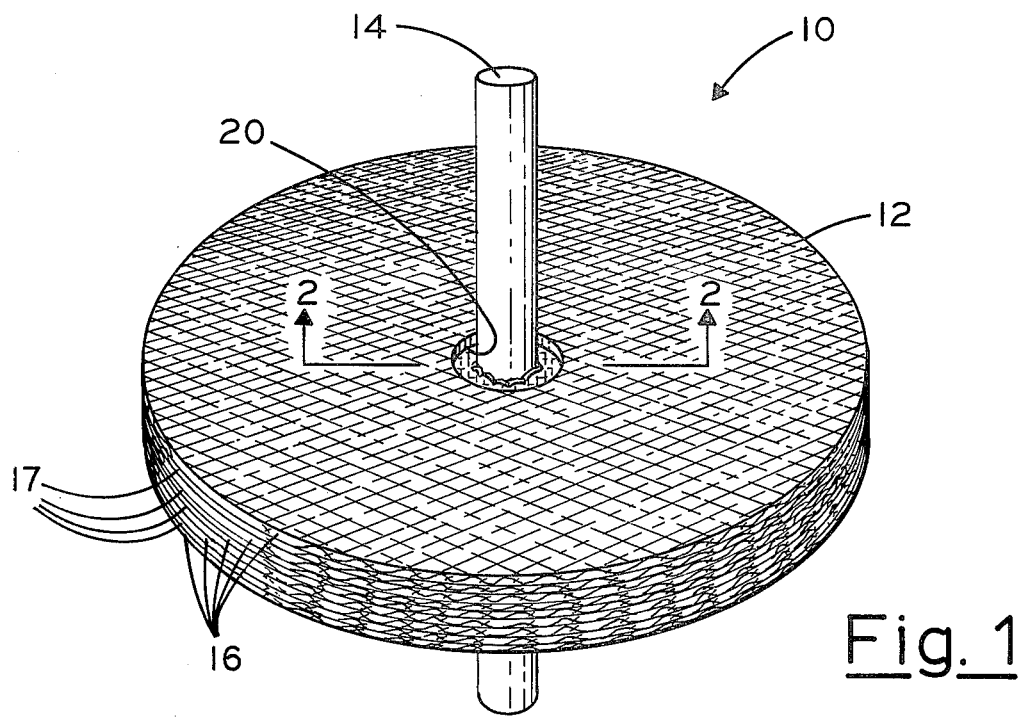
FIG. 1 comprises a perspective view of a flywheel including an improved rotatable mass which embodies the principles of the instant invention.

Referring now to the drawings wherein like reference characters designate like or corresponding parts throughout the several views, there is shown in FIG. 1 a flywheel, generally designated 10, including a rotatable mass 12 which embodies the principles of the instant invention.

The mass 12 is, as shown, affixed to a spin shaft 14 which supports the mass for rotation in order to store inertial energy, in accordance with principles will understood by those familiar with the design and operation of flywheels.

The mass 12 comprises a plurality of laminated disks 16 and 17 which are bonded together to form an integrated structure. Each of the disks 16 and 17 consists of a plurality of orthogonally related fibers 18 woven to form a relatively fine mesh or screen. The specific material from which the fibers 18 are formed is varied as desired. It is to be understood, however, that the material from which the fibers 18 are formed possesses high tensile strength characteristics. Such material is typified as titanium, steel, molybdenum, and fused silicon, as well as various synthetic and organic fibers.

As can be appreciated with those familiar with the design and operation of energy storage devices which utilize basic principles of the flywheel, the radial and tangential stresses tend to be greater near the inner radii of the employed rotatable mass and drop to a minimum at near outer radii.

Figure 2:
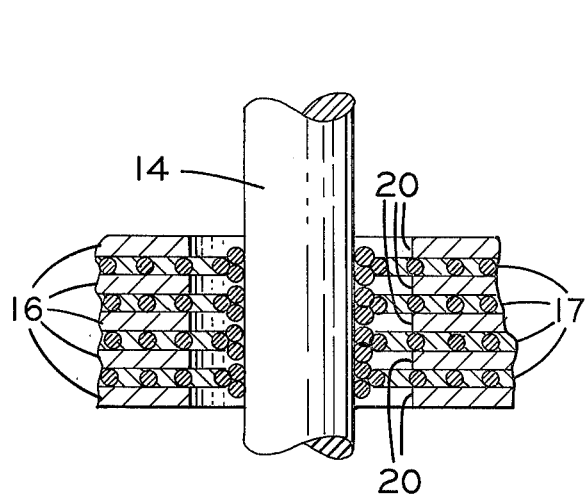
FIG. 2 is a fragmented cross-sectional view taken generally along line 2—2 of FIG. 1.
Figure 3:
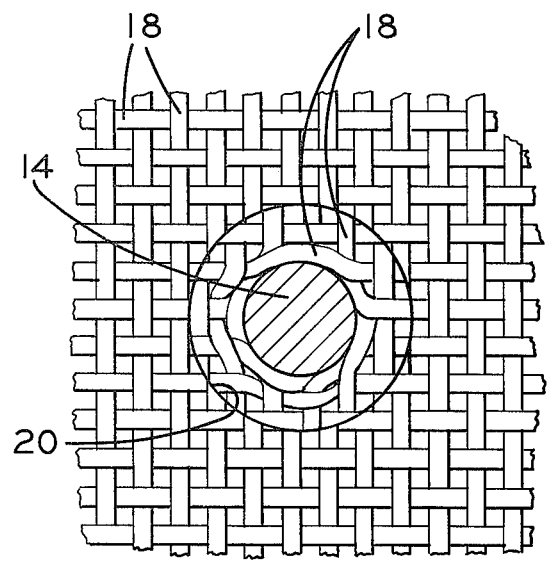
FIG. 3 is a fragmented, partially sectioned top plan view of the rotatable mass shown in FIG. 1.

Therefore, as is best illustrated in FIG. 3, the fibers 18 of alternate disks 17 are, during fabrication of the flywheel 10, spread apart near the midportion thereof a distance sufficient for receiving the spin shaft 14 without fracturing fibers. Of course, the spreading of the fibers tends to displace the material of the disk and to increase the thickness or axial dimension of the disk about the periphery of the spin shaft 14. Thus a thickened midsection is imparted to each of the disks 17. In order to accommodate the increased thickness of the disks 17, the midsection of the fibers of adjacent disks 16 are severed and circular portions are removed from the centers of the disks 16, whereby annular voids 20 are formed at opposite sides of each thickened midsection of the disks 16 for receiving the material displaced from disks 17, as illustrated in FIG. 2.

The disks 16 and 17 are bonded together utilizing any suitable bonding material such as epoxy resins and the like and thereafter similarly bonded to the spin shaft 14. Thus the mass 12 is bonded into an integrated body rigidly affixed to the spin shaft.

The improved rotatable mass 12 of the instant invention, when driven in rotation, tends to more efficiently employ the tensile strength of fibers 18 due to their interwoven and directional relationships. Further, because the fibers 18 of disks 17 have uninterrupted lengths, the strength of the mass 12 is enhanced, near the inner radii. Since the materials from which the mass 12 is fabricated can easily and readily be provided through conventional weaving techniques and the disks 16 and 17 can be bonded together and to the spin shaft 14 utilizing commercially available epoxy, the mass 12 can be fabricated economically. Of course, the number of disks employed is varied as desired, however, it is noted that the disks 16 should be disposed in alternate juxtaposition with the disks 17 in order that the voids 20 readily can be utilized in accommodating the axial expansion of the material of the disk 17 as the fibers are separated for receiving the spin shaft 14. Moreover, by employing a woven material in forming the disks, the ease with which separation of the fibers is effected for receiving the spin shaft 14 is greatly enhanced.

Of course, the rotatable energy storage device which embodies the principles of the instant invention is particularly adapted to be statically and dynamically balanced.

Although the invention has been herein shown and described in what is conceived to be the most practical and preferred embodiment, it is recognized that departues may be made therefrom within the scope of the invention, which is not to be limited to the illustrative details disclosed.

I claim:

1. An improved rotatable mass for a flywheel comprising:

a mass including a plurality of contiguous, coaxially related disks, each disk being formed of a plurality of woven fibers disposed in a plane transversely related to an axis of rotation extended through the mass, the fibers of alternate disks being continuous throughout their length; and a spin shaft extended through the mass in concentric relation with said axis of rotation.

2. The device of claim 1 wherein the midportions of the fibers of the disks interposed between the alternate disks are removed for forming an annular void concentrically related to said spin shaft.

3. The energy storage device of claim 2 wherein said alternate disks are bonded to said spin shaft and the disks interposed between the alternate disks are bonded to said alternate disks.

* * * * *